METHODS AND APPARATUS FOR RECORDING WELL LOGGING SIGNALS

Denis R. Tanguy
INVENTOR.

BY Edward M. Roney

ATTORNEY

Denis R. Tanguy
INVENTOR.

BY Edward M. Roney

ATTORNEY

Jan. 6, 1970 D. R. TANGUY 3,488,658

METHODS AND APPARATUS FOR RECORDING WELL LOGGING SIGNALS

Filed Dec. 27, 1967 7 Sheets-Sheet 3

Denis R. Tanguy
INVENTOR.

BY Edward M. Roney

ATTORNEY

Denis R. Tanguy
INVENTOR.

BY Edward M. Roney

ATTORNEY

Denis R. Tanguy
INVENTOR.

BY Edward M. Roney

ATTORNEY

Denis R. Tanguy
INVENTOR.

BY Edward M. Roney

ATTORNEY

Denis R. Tanguy
INVENTOR.

BY Edward M. Roney

ATTORNEY

United States Patent Office 3,488,658
Patented Jan. 6, 1970

3,488,658

METHODS AND APPARATUS FOR RECORDING WELL LOGGING SIGNALS

Denis R. Tanguy, Darien, Conn., assignor to Schlumberger Technology Corporation, New York, N.Y., a corporation of Texas Filed Dec. 27, 1967, Ser. No. 693,818
Int. Cl. G01d *9/00,* G01v *7/04*
U.S. Cl. 346—1 13 Claims

ABSTRACT OF THE DISCLOSURE

The particular embodiments described herein as illustrative of the invention describe techniques for recording well logging signals. More particularly, the well logging signals modulate the light intensity output of a glow modulator tube. The light from the glow modulator tube is reflected off of a rotating mirror to be swept across a recording medium which moves as a function of borehole depth. For the case of recording so-called "sonic logging signals," the mirror is rotated at the same frequency that the sonic transmitter is energized. Other embodiments show recording techniques in which the amplitudes of the well logging signals are recorded as trace width rather than as trace density.

This invention relates to the recording of well logging signals and, more particularly, to the recording of recurrent well logging signals which are supplied from a downhole investigating apparatus at periodic time intervals.

One type of recurrent well logging signals is the type found in "sonic logging." In the typical sonic logging method, an acoustic burst of energy is transmitted into the earth formations adjoining a borehole from a suitable transmitting transducer and a nearby receiving transducer converts the received acoustical waves to electrical signals suitable for transmission to the surface of the earth. The transmitter is fired at periodic time intervals and thus the received signals are recurrent in nature. One way of recording such recurrent signals is to record a variable density log of these signals by varying the electron beam intensity of an oscilloscope, as shown in U.S. Patent No. 3,302,165 granted to T. O. Anderson et al. on Jan. 31, 1967.

While such variable density recording utilizing an oscilloscope produces generally acceptable results, the complexity, cost and relative size of such oscilloscopes have proven distinct disadvantages in their utilization for the recording of well logging signals. When investigating earth formations surrounding a borehole, a truck is usually driven to the well site to carry out the well logging operation. As well logging techniques become more and more sophisticated thus requiring more equipment, the size of equipment in the truck becomes increasingly more important. It would therefore be desirable to provide apparatus for recording well logging signals which apparatus is simpler, less bulky, and less expensive than the recording apparatus which has been used heretofore.

Also, in connection with recording such recurrent type signals, there has sometimes been a difficulty in obtaining highly accurate results due to recording intensity control problems as well as problems in developing the film. That is to say, in variable density recording, since the density of the traces on the developed film is proportional to the amplitude of the well logging signals, variations in the sensitivity of the film as a function of amplitude as well as variations in th e developing, e.g., temperature and time, can cause errors in the density of the indications on the film. It would therefore be desirable to provide a new recording technique for recording well logging signals wherein the same information which has been heretofore obtained in variable density recording can be obtained without the usual problems in variable density recording. In this connection, it would also be desirable to provide such a recording technique with relatively simple, inexpensive, and nonbulky recording equipment. It would also be desirable to provide a recording which could easily and with good accuracy be played back, i.e., another recording of a different nature made from a first recording.

It is an object of the invention therefore to provide new and improved methods and apparatus for recording well logging signals.

In accordance with the present invention, methods and apparatus for recording well logging signals comprise moving a recording medium as a function of borehole depth and producing an image on the recording medium. The image is modulated by the well logging signals to be recorded. The image is then periodically swept across the width of a recording medium. In one form, an optical system having a glow modulator tube as the light source and a rotating reflective means to sweep the modulated light across the recording medium is utilized. This recording technique is especially useful where the well logging signals are of the type wherein energy is periodically transmitted into earth formations surrounding a borehole and energy caused by the transmitted energy is received and converted into electrical signals. In this case, the rotation of the reflective means is synchronized with the frequency at which energy is transmitted into the adjoining formations. This synchronization can also be achieved by slaving the transmission of energy into the earth formations to the rotation of the reflective means. In another form, the invention comprises converting the amplitudes of the well logging signals into constant amplitude signals whose time periods are representative thereof and modulating the image produced on the recording medium with these time period signals.

For a better understanding of the present invention, together with other and further objects thereof, reference is had to the following description taken in connection with the accompanying drawings, the scope of the invention being pointed out in the appended claims.

Referring to the drawings.

Figures 1, 1A:
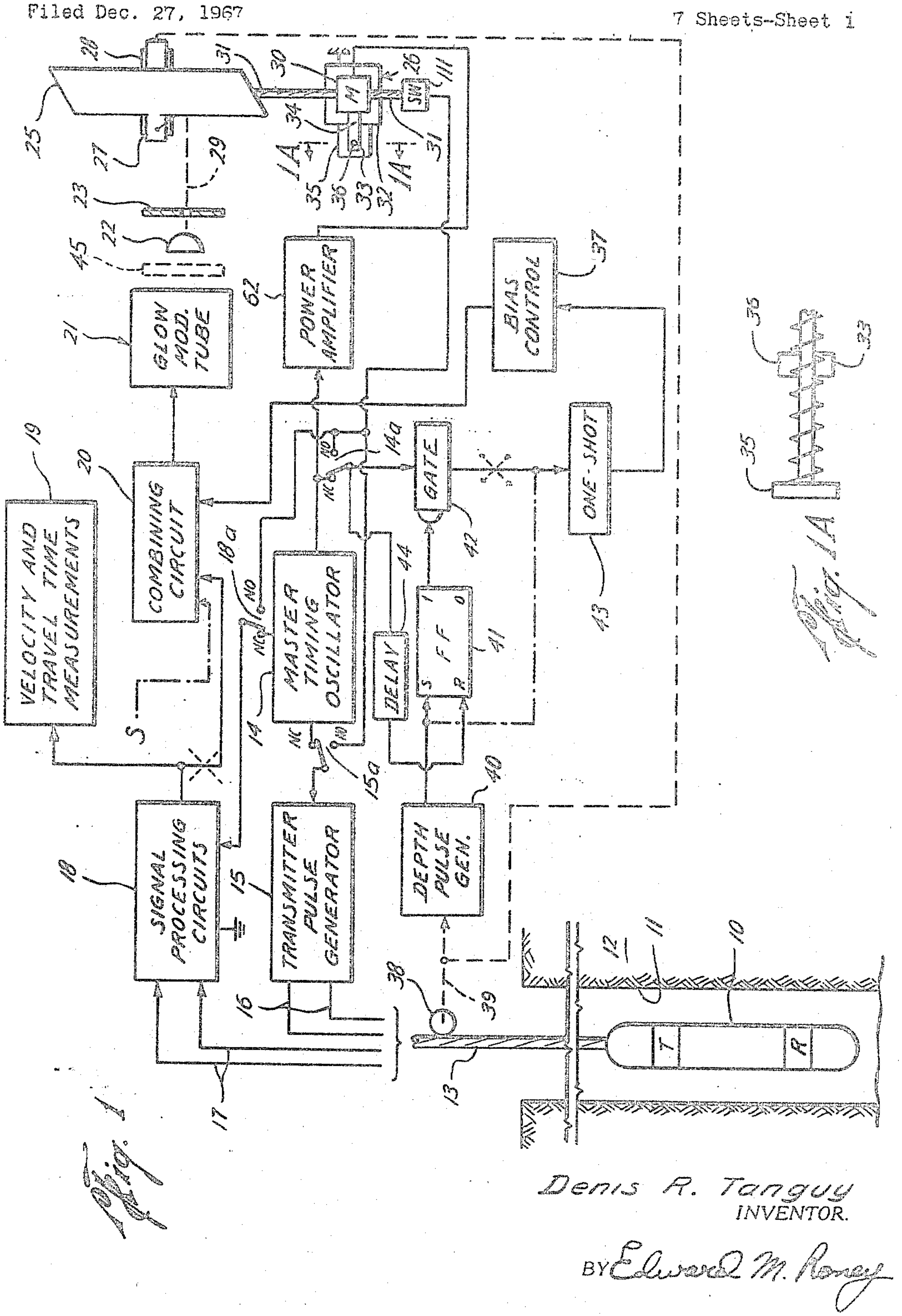
FIGURE 1 shows an investigating apparatus in a borehole along with a schematic representation of one embodiment of apparatus for recording well logging signals derived from the investigating apparatus.
FIGURE 1A shows a cross section view taken along the section lines 1A—1A of the motor assembly of FIGURE 1.
Figure 4:
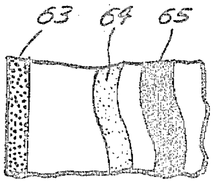
Figure 5:
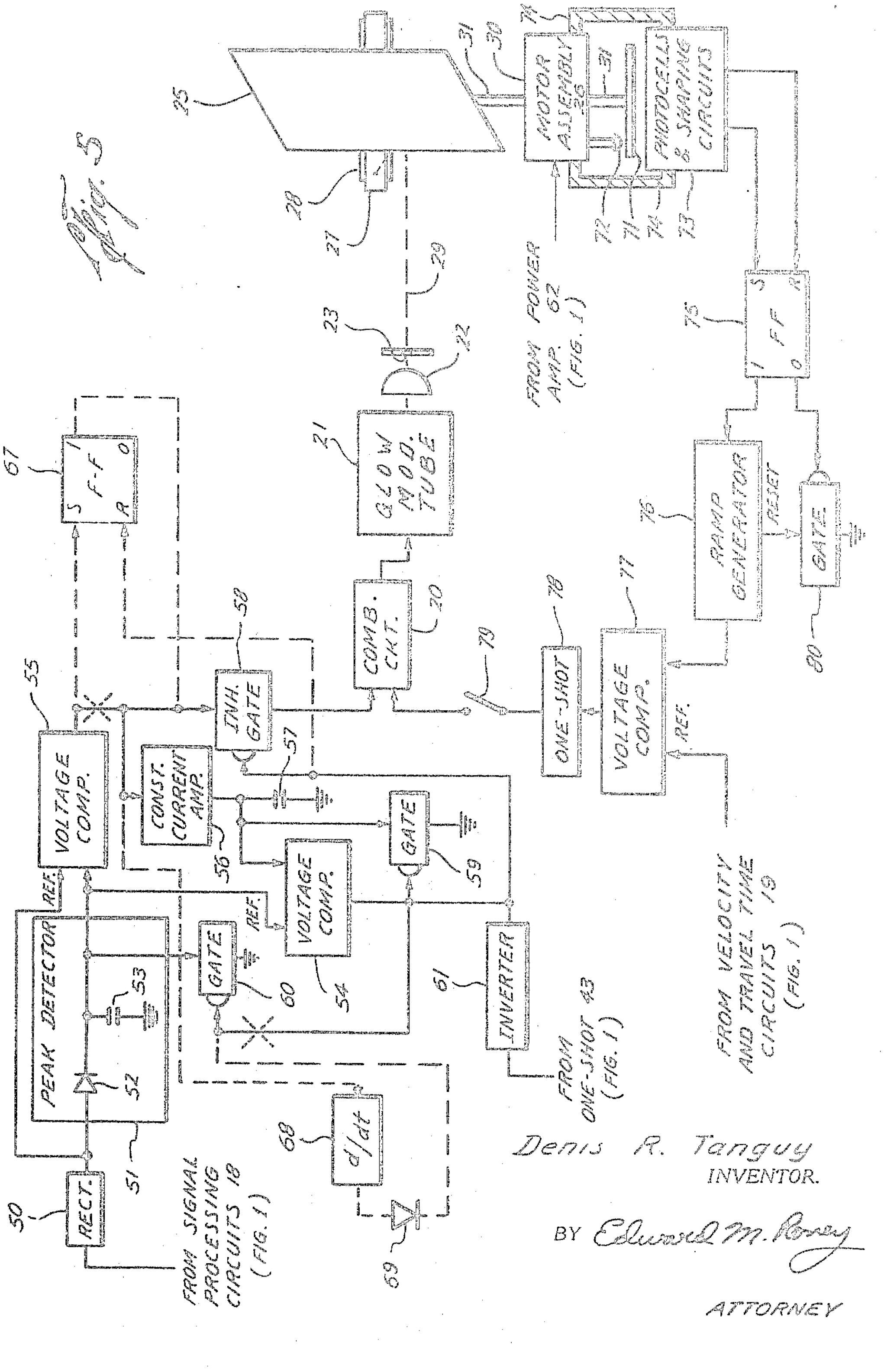
Figures 8A, 8B, 8C:
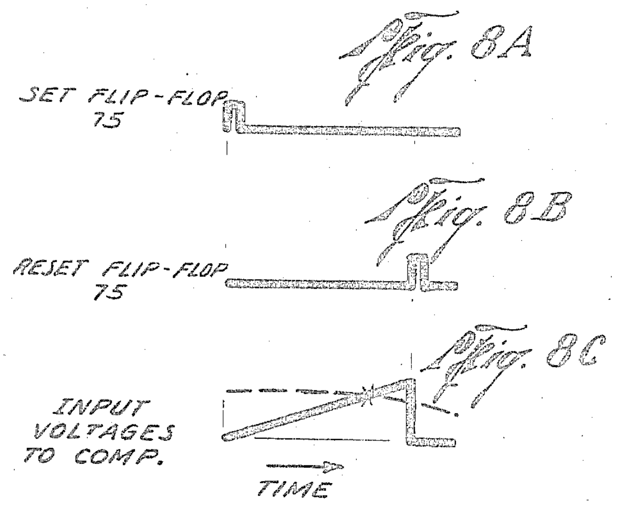
Figure 7:
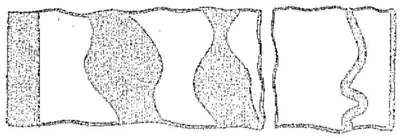
Figure 9:
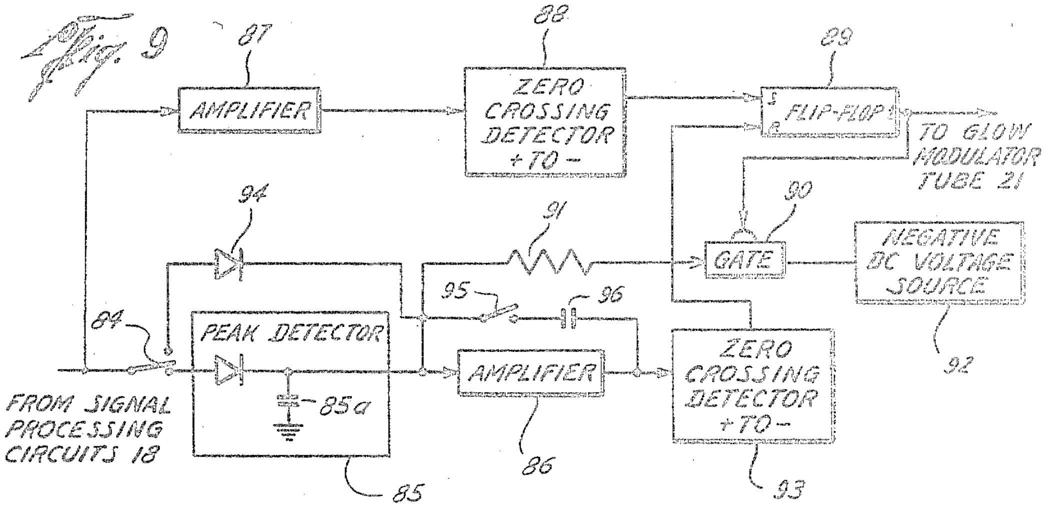
Figure 11:
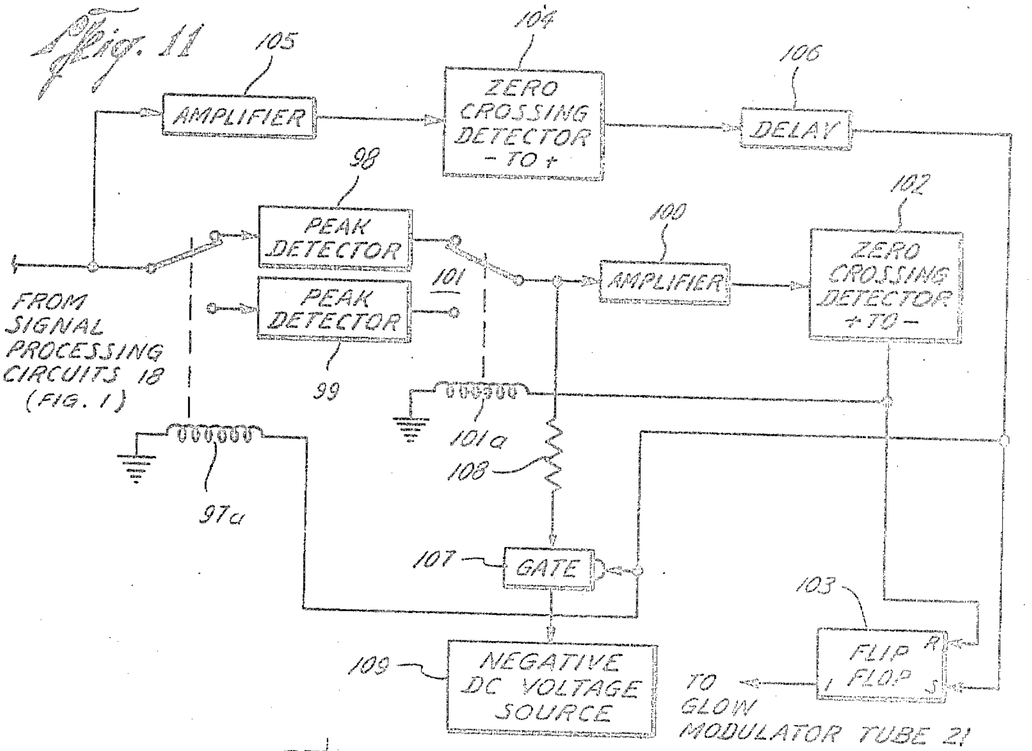

FIGURES 3A–3E graphically represent a typical operation of various portions of the FIGURE 1 apparatus;

FIGURE 4 represents a typical example of how the recording medium shown in the FIGURE 1 apparatus might look after developing;

FIGURE 5 shows schematically another embodiment of the present invention for recording well logging signals;

FIGURES 6A–6E represent graphically a typical operation of certain aspects of the FIGURE 5 apparatus;

FIGURE 7 shows a typical example of how the recording medium of FIGURE 5 might look after developing;

FIGURES 8A–8C show voltage wave forms at various points in the FIGURE 5 apparatus;

FIGURE 9 shows schematically another embodiment of the present invention;

FIGURES 10A–10E represent graphically a typical operation of the FIGURE 9 apparatus;

FIGURE 11 shows still another embodiment of the present invention; and

FIGURES 12A–12F represent graphically a typical operation of the FIGURE 11 apparatus.

Now referring to FIGURE 1, there is shown a downhole investigating tool disposed in a borehole 11 for investigating earth formations 12. The tool 10 is supported in the borehole on the end of an armored multiconductor cable 13 which is raised and lowered by a suitable drum and winch mechanism (not shown). The tool 10 is a sonic logging tool having a transmitter T for emitting bursts of acoustic energy and a receiver R displaced a suitable distance from the transmitter T for receiving the acoustic energy. Suitable electronic equipment such as amplifiers may be placed in the downhole tool 10 in the usual manner.

Now referring to the circuitry at the surface of the earth, a master timing oscillator 14 having a substantially constant frequency provides timing signals to a transmitter pulse generator 15 via the normally closed contact of a double-throw switch 15*a*, which generator 15 supplies transmitter firing pulses to the transmitter T within the tool 10 via the cable 13. The received signals from the receiver R are supplied to the surface of the earth via the cable 13 to suitable signal processing circuits 18. As is usually the case, the transmitter firing pulse supplied to the transmitter T can also be coupled onto the conductor pair 17 at the tool to provide a timing reference for the signals supplied to the surface of the earth from the receiver R. The signals from the master timing oscillator 14 may also be supplied to the signal processing circuits 18 via the normally closed contact of a double-throw switch 18*a* for suitable control purposes and the signals from signal processing circuits 18 may be supplied to suitable velocity and travel time measurement apparatus 19. The apparatus described thus far is merely an example of typical sonic logging apparatus which could be used with the recording features of the present invention. Logging apparatus other than sonic could also be used here.

The signals from signal processing circuits 18 are also supplied to a combining circuit 20, whose output is connected to the input terminals of a glow modulator tube 21 to modulate the light output therefrom. This glow modulator tube 21 could comprise, for example, a Sylvania GM514 Glow Modulator Tube. The light from the glow modulator tube passes through a first lens 22 and a slit 23 which has a relatively narrow width, as shown, but a fairly large height (the dimension extending into the paper). The large height allows more light to pass through. The light which passes through the slit 23 is reflected off of a rotating mirror 25 and passes through another lens, which lens is obscured by the mirror 25 in FIGURE 1. The light then passes through a lens 27 and impinges on recording medium 28 as a point image. This representation of the light passing from glow modulator tube 21 to recording medium 28 as a single ray of light, in effect, represents the light as recording medium 28 would visualize it. The light beam is, in reality, a bundle of light rays and the various lenses act to make a point image on the film, as will become apparent when discussing FIGURE 2.

The mirror 25 is rotated by a suitable motor assembly 26 which includes a motor 30 which rotates the mirror 25 via a shaft 31. The motor 30 is enclosed in a suitable housing 32 which is fixed in space. The motor 30 is adapted to rotate with respect to the housing 32. To accomplish this, the space between the motor 30 and housing 32 can be filled with ball bearings, oil or some other similar material to provide easy rotation of the motor 30 with respect to the housing 32. To provide for rotation of the motor 30, a lever arm 33 is attached to the motor 30 and passes through an opening 34 in the motor housing 32. This opening 34 has a sufficient length so as to enable a desired degree of rotation of the motor 30. A thumbscrew 36 passes through an opening in the lever arm 33 and rests against a stop member 35. This can better be seen in FIGURE 1A which is a cross section view through the screw 36 of FIGURE 1. In FIGURE 1A, it can be seen that, by turning the thumbscrew 36, the lever arm 33 and thus the motor 30 will rotate with respect to the housing 32. The screw 36 can be made of a flexible material so as to be routed to the front panel of the recording apparatus to allow adjustment of the relative angular position of motor 30. Other suitable adjustment means could also be provided, such as a gearing arrangement between the housing 32 and motor 30, to accomplish this rotational adjustment.

Figure 2:
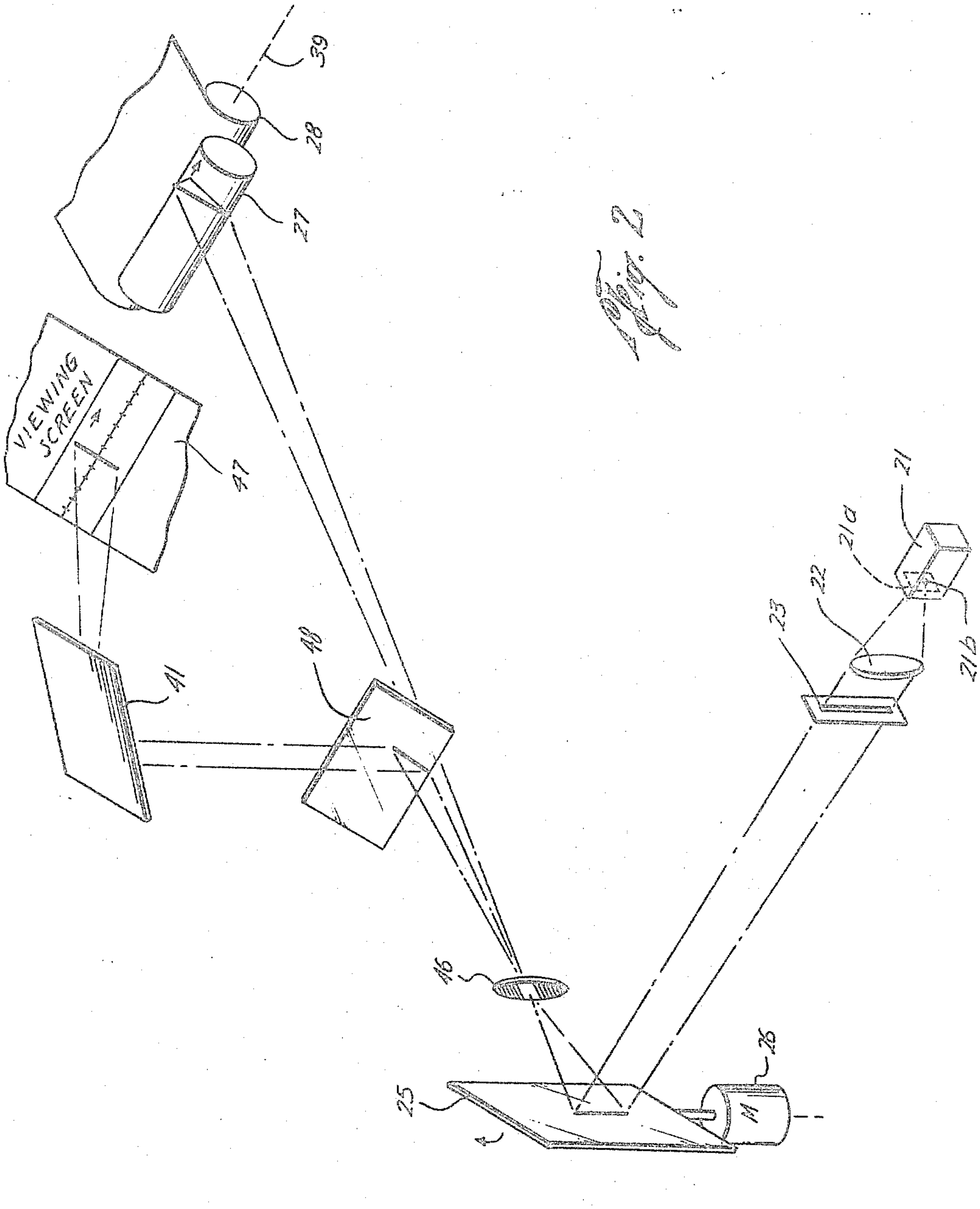
FIGURE 2 shows an isometric view of an optical system that may be utilized with the present invention.

Referring now to FIGURE 2, there is shown an isometric view of the optical features of the recording apparatus of FIGURE 1. The glow modulator tube 21 includes an opaque plate 21*a* which has a circular hole or cut-out portion 21*b* therein through which the light passes. The electrode portion of the glow modulator tube 21 is not shown in FIGURE 2. The light passing through the hole 21*b* passes through the lens 22 which acts to gather the light from the glow modulator tube 21 and pass it through the slit 23. The focal length of the lens 22 is selected so as to develop an image of the circular hole 21*b* on a lens 46, which is situated on the recording medium side of the rotating mirror 25. The focal length of the lens 46 is selected so that an image of the slit 23 will appear on the recording medium 28 (forgetting for a moment the cylindrical lens 27), and on a viewing screen 47 after reflecting off of a pair of stationary mirrors 48 and 49. The viewing screen 47 desirably has grid marks (not shown) thereon corresponding with various positions across the width of the recording medium 28 so that the positions of both the viewing screen and recording medium can be correlated.

The geometrical projections from the slit 23 through the lens 46 to the recording medium 28 and viewing screen 47 are shown in FIGURE 2 to give a better understanding of how images of the slit 23 are made on both the recording medium 28 and viewing screen 47. By placing the mirror 48 in a position so as to intercept a portion of the light traveling to the recording medium 28, the sweeping light can be divided in two directions. The upward reflected light is then reflected off of a mirror 49 onto the viewing screen 47 so as to make an image thereon. The remainder of the light not intercepted by mirror 48 passes to the cylindrical lens 27 which acts to focus the light to a point image on the recording medium 28. The lens 46 is desirably masked so as to provide an object of a fixed vertical length for the cylindrical lens 27. This then will insure that the height of the spot made on the recording medium 28 is constant. The width is controlled by the width of the slit 23 in combination with the focal length of the lens 46 and the distances between the slit 23 and lens 46 and the recording medium 28 and lens 46.

Thus, it can be seen that, as the rotating mirror 25 rotates in a clockwise direction (looking down on the mirror), the images on the viewing screen 47 and the recording medium 28 will move from left to right across the viewing screen and recording medium. Thus, the apparatus of FIGURE 2 for placing images on the viewing screen and recording medium is an image producing means adapted to be modulated. This modulation takes the form, in FIGURE 2, of modulating the light output of glow modulator tube 21.

It is to be understood that certain other corrective lens and filters could be placed in the optical system of FIGURE 2 in accordance with standard optical techniques, such as for example, a gradient filter to make sure that the image brightness is constant for any angular position of mirror 25 (for any given constant light output of tube 21). Likewise, since the distance between the recording medium 28 and rotating mirror 25 changes slightly as the light spot is swept across the recording medium, a suitable corrective lens could be provided, Also, if desired mirrors could reflect the light passing to the recording medium 28 to any desired position, in the same manner as the light is reflected to the viewing screen 47.

Now referring back to FIGURE 1, the signals modulating glow modulator tube 21, as will be explained ging measurements. However, since the rate at which later, provide a variable density trace of the well logging measurements. However, since the rate at which the tool 10 ascends through the borehole cannot always be constant and thus the rate of travel of recording medium 28 cannot always be constant, circuitry is shown in FIGURE 1 for providing a trace of the well logging measurement on the recording medium 28 at constant intervals of depth and thus at a constant spacing on the recording medium 28. Otherwise, the changes in the rate of movement of the logging tool 10 through the borehole may tend to make the number of traces per inch on the recording medium more dense when the investigating means 10 is moving at a slow rate of speed and less dense when it is moving at a relatively fast speed.

To accompish this even distribution of traces across the recording medium 28, a bias control circuit 37 supplies zero volts or some negative voltage to the combining circuit 20 to maintain the light intensity output of glow modulator tube 21 low enough to inhibit an image from being recorded on the recording medium 28. Then, to record a signal, bias control circuit 37 supplies a bias voltage of a given desired positive value to the combining circuit 20. This bias level is desirably set at a light intensity level where very little, if any, trace is visible on the recording medium (after developing) but an increase in light intensity will produce a visible trace.

To control the time at which a trace is to be recorded, a suitable rotating wheel 38 is disposed adjacent to the cable 13 so as to rotate a mechanical shaft 39 as a function of the movement of cable 13, and thus, the depth of the tool 10 in the borehole. The shaft 39 is coupled to a depth pulse generator 40 which could comprise, for example, an optical slotted drum for generating pulses at given intervals of movement of the cable 13. The shaft 39 is also supplied to the pick-up reel of the recording medium 28 so as to move the recording medium 28 as a function of borehole depth.

The pulses from depth pulse generator 40 set a flip-flop 41 whose "1" output energizes a gate circuit 42. The output pulses from master timing oscillator 14 are then supplied via the normally closed contact of a double-throw switch **14*a* and through the gate circuit 42, when energized, to energize a one-shot 43 whose "on-time" is slightly greater than the time for rotating mirror 25 to sweep across the width of the recording medium 28. The pulses from one-shot 43 energize the bias control circuit 37 which acts to bias the glow modulator tube 21 on for one sweep across the recording medium 28. Bias control circuit 37 could comprise a switching arrangement, like a relay, which normally supplies a negative voltage to combining circuit 20 but when energized supplies the proper positive bias voltage thereto. To reset the flip-flop 41, the pulse from master timing oscillator 14 which energized one-shot 43, resets flip-flop 41 via the normally closed contact of switch 14*a* after a suitable delay by delay circuit 44. The delay eliminates a race condition, thus insuring that one-shot 43 will be energized. It can be seen that, by this circuit arrangement, traces will be recorded on the recording medium 28 at equal intervals of depth since flip-flop 41 is "set" only at equal depth intervals, and thus bias control circuit 37 biases the glow modulator tube 21** on only at these selected depth intervals.

It should be mentioned here that instead of controlling the transmitter pulse generator 15 and the motor 30 from the master timing oscillator 14, the rotating mirror 25 could be rotated at a constant speed and transmitter firing slaved to the rotation of the mirror 25. This is represented in FIGURE 1 by connecting a switch 111 to the shaft 31, which switch causes a pulse to be periodically generated in synchronism with the rotation of the mirror 25. In this alternative arrangement, the double-throw switches **14*a*, 15*a* and 18*a* are placed in their normally open position whereby the master timing oscillator 14 will drive the motor 30 via power amplifier 62 and the pulses from switch 111** will provide timing signals for the remainder of the circuitry of FIGURE 1.

Figure 3A:
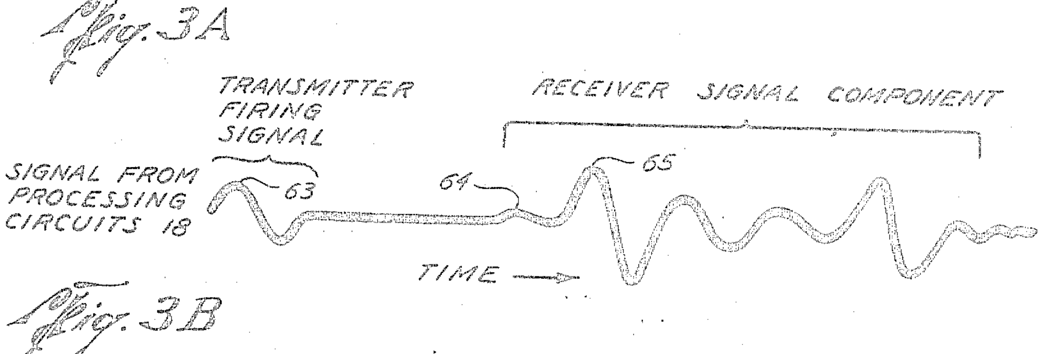

Referring to FIGURES 3A–3E to gain a better understanding of the operation of the FIGURE 1 apparatus, FIGURE 3A shows the signals from the signal processing circuits 18. The first portion of the signal (on the left-hand side) is the transmitter firing signal received at the surface of the earth and the later arriving signal (signal on the right-hand side) is the signal received at the surface of the earth which was picked up by the receiver R in the tool 10.

Figure 3B:
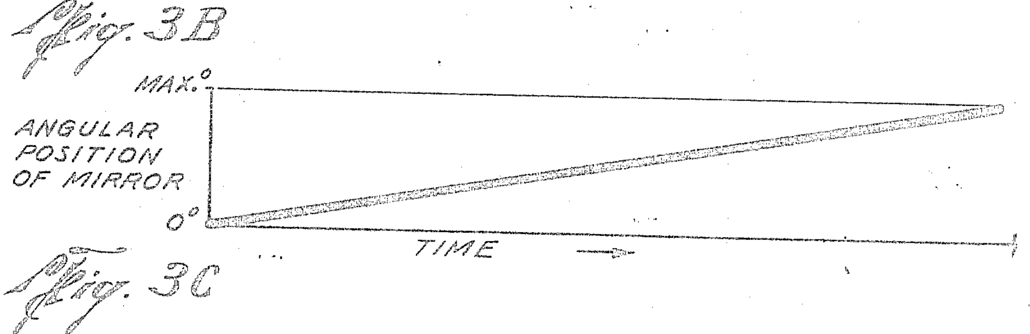
Figure 3C:
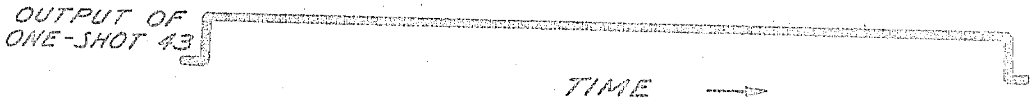
Figures 3D, 3E:
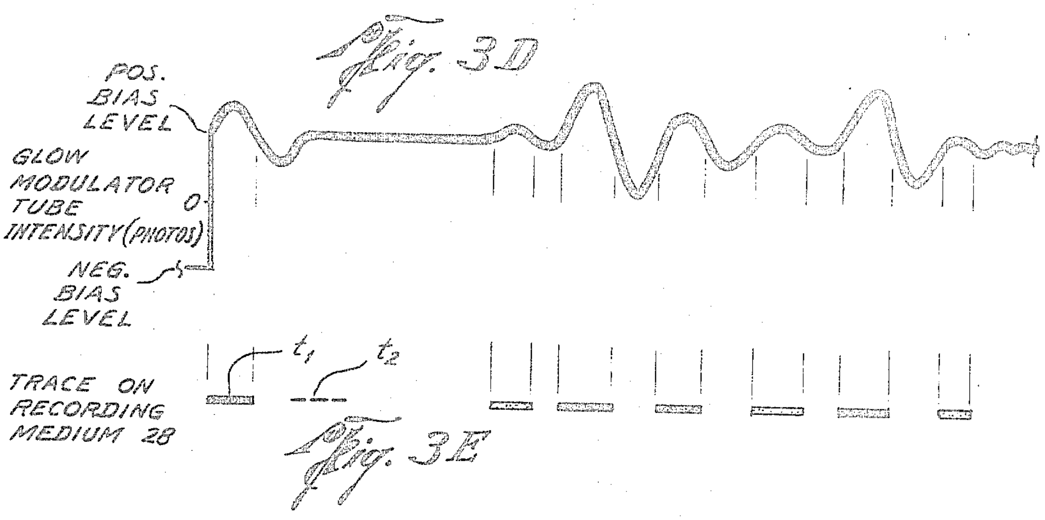

Looking at FIGURE 3B, there is shown a plot of the angular position of the rotating mirror 25 as a function of time. Since the mirror is rotating at a constant angular velocity, the time axis of FIGURE 3B can also be considered to be the width of the recording medium 28. That is to say, as the mirror rotates from 0° to the maximum angular position (0° is the left-hand side of recording medium and maximum° is the right-hand side), the beam of light can be considered to be sweeping across the film on the horizontal axis of FIGURE 3B. FIGURE 3C shows the output wave form of one-shot 43 which causes the bias control circuit 37 to bias the glow modulator tube 21 to the proper bias level. FIGURE 3D shows the bias level of glow modulator tube 21 rising to the "positive bias level" when one-shot 43 is energized and the subsequent modulation of the light output of glow modulator tube 21 as a function of the signal of FIGURE 3A. The modulation of the glow modulator tube will, of course, have the same wave form as the signals applied thereto.

Looking at FIGURE 3E, there is shown the resulting trace on the recording medium 28 due to this modulation of glow modulator tube 21 (the solid line trace of FIGURE 3E). It can be seen that the density of the trace on the recording medium is proportional to the intensity of the glow modulator tube and the width of each trace is equal to the period of each half cycle. This is because, as the light intensity of the glow modulator tube 21 increases, the density of the trace on the recording medium 28 will likewise increase and when the intensity falls below the bias level, the trace will all but disappear. In actuality, if one studies the film or recording medium after it has been developed, it will be found that there may be a very slight trace on the film at the points where the intensity is near the bias level. As the intensity approaches zero photons, the trace will substantially disappear.

The usual glow modulator tube changes from blue to red colored light as the intensity of the light output from the glow modulator tube 21 increases. Thus, by placing a suitable red colored filter 45 (see FIGURE 1) somewhere between the glow modulator tube 21 and the recording medium 28 and setting the bias level at the junction point between the blue and red light, the trace could be made to substantially disappear when the intensity falls below the bias level and therefore when the signal wave form of FIGURE 3A falls below zero volts. This could also be accomplished by providing color sensitive film or suitable color sensitive processing.

Now concerning the synchronizing of the rotation of the mirror 25 with the modulation signal of FIGURE 3A applied to the glow modulator tube 21, the frequency of the sweep across the recording medium 28 should correspond with the frequency at which information is to be recorded. Thus, in the sonic logging apparatus of FIGURE 1, it is desired to record the well logging signals from signal processing circuits 18 at the transmitter firing rate or some multiple thereof. (Some multiple because the received well logging signals are only recorded when one-shot 43 is energized, not each time the transmitter is fired.) To accomplish this synchronization, the signal from master timing oscillator 14, after amplification by a power amplifier 62, drives the motor 30 at the same frequency as the frequency of master timing oscillater 14. Therefore, the rotating mirror 25 makes one complete revolution for each cycle of the signal of master timing oscillator 14. In this connection, it is to be understood that the rotating mirror 25 could have more than one reflective surface. In this case, the motor 30 could have suitable gearing to provide one sweep for each transmitter firing.

It would also be desirable to have synchronism between the arrival of the transmitter firing pulse at the surface of the earth and the position of the image on the recording medium 28. That is, the transmitter firing trace should appear at the same position on the recording medium 28 for each sweep of the light across the recording medium 28. To accomplish this, the relative position of the motor 30 can be adjusted by turning the thumbscrew 36. Looking at FIGURE 3E, the dotted line trace $t_2$ represents the transmitter firing pulse having shifted to the right from the desired position, designated $t_1$. The position of the transmitter pulse can be observed by the operator by merely noting the position of the image corresponding to this transmitter pulse on the viewing screen 47. This trace on the viewing screen corresponding to the transmitter firing pulse, $t_1$ or $t_2$ can be distinguished from the remainder of the traces by its relative displacement from the other traces. By turning the thumbscrew 36, this transmitter firing trace $t_2$ can be adjusted back to the position $t_1$ in FIGURE 3E.

Referring to FIGURE 4, there is shown an example of how the recording medium or film might look after developing. The trace on the left-hand side, designated 63, corresponds to the similarly designated transmitter firing signal of FIGURE 3A. Likewise,the traces designated 64 and 65 correspond to the similarly designated portions of the receiver signal component of FIGURE 3A. (It is to be understood that FIGURE 3A represents one sweep across the recording medium while FIGURE 4 represents a plurality of sweeps.) It can be seen in FIGURE 4 that the width of each trace 63, 64 and 65 corresponds to the time period of the positive portion of the corresponding wave shape. In addition, the density or darkness of the trace corresponds to the amplitude of the respective wave shape.

Thus, it can be seen that, with the apparatus of FIGURE 1, relatively simple and inexpensive apparatus can be utilized to make variable density logs since the size of such an optical system can be made relatively small. In addition, since galvanometric recorders are already extensively used in well logging, the apparatus of the present invention could be added to present galvanometric recorders with only a minimal amount of additional space.

The apparatus of FIGURE 1 could also be adapted to record other types of well logging signals, such as a continual analog signal, like that derived from so-called "induction logging" apparatus. In this event, the analog signal could be sampled at appropriate times for recording. This is represented in FIGURE 1 by the dash-dot line connecting the analog signal S to the combining circuit 20 and the output of depth pulse generator 40 energizing the one-shot 43. The output of gate 42 and signal processing circuits 18 are X'ed out in this embodiment. Thus, in operation, one-shot 43 will bias glow modulator tube 21 on for a selected time interval at selected depth intervals to record the well logging signal S.

Referring now to FIGURE 5, there is shown another embodiment for recording well logging signals utilizing the glow modulator tube and rotating mirror of FIGURE 1. In the FIGURE 5 embodiment, apparatus is provided for recording a constant density trace for any given well logging signal amplitude and varying the width of the trace as a function of the peak amplitude. In this manner, variations in light intensity or film developing will not produce errors in the recorded log, yet the amplitude and arrival time relationships between portions of the well logging signal will still be recorded.

In FIGURE 5, part of the circuitry of FIGURE 1 is assumed to be present, though not shown in FIGURE 5. This circuitry comprises the circuitry for deriving the well logging signals as well as the apparatus for providing the periodic bias pulses from one-shot 43. The signals from signal proceeing circuits 18 of FIGURE 1 are, in FIGURE 4, supplied via a rectifier 19, which passes only the positive portions of the well logging signals, to a peak detector 51. Peak detector 51 is shown comprising a forward-biased diode 52 and a shunt capacitor 53 for purposes of illustration, but could comprise any known type of peak detector. The output signal from peak detector 51 is supplied as the reference input to a voltage comparator 54 and the signal input to a voltage comparator 55, both of which have high input impedances so as to not discharge capacitor 53. The output of rectifier 50 is also supplied to voltage comparator 55 as the reference voltage input thereof.

When the signal input to voltage comparator 55 exceeds the reference voltage supplied thereto, voltage comparator 55 provides an output signal. This output signal is supplied to a ramp generator comprising a constant current amplifier 56 charging up a capacitor 57 at a constant rate. This voltage developed across capacitor 57 is supplied to the high impedance signal input of comparator 54. The output signal from voltage comparator 55 is supplied through an inhibit gate 58, when unenergized, to the combining circuit 20 and glow modulator tube 21. The optical assembly for passing the light from glow modulator tube 21 to the recording medium 28 is the same as in FIGURE 1 and need not be discussed in connection with FIGURE 5.

When the voltage across capacitor 57 has charged to a value slightly greater than the reference voltage applied to voltage comparator 54, voltage comparator 54 provides an output signal which energizes gates 59 and 60 to discharge capacitors 57 and 53 respectively. This resets the circuits in readiness for recording another well logging signal. To provide even spacing of traces on the recording medium, the output pulse from one-shot 43 (FIGURE 1) are supplied to an inverter 61, the inverted output signal being supplied to the control terminals of gates 58, 59 and 60.

Figures 6A, 6B, 6C, 6D, 6E:
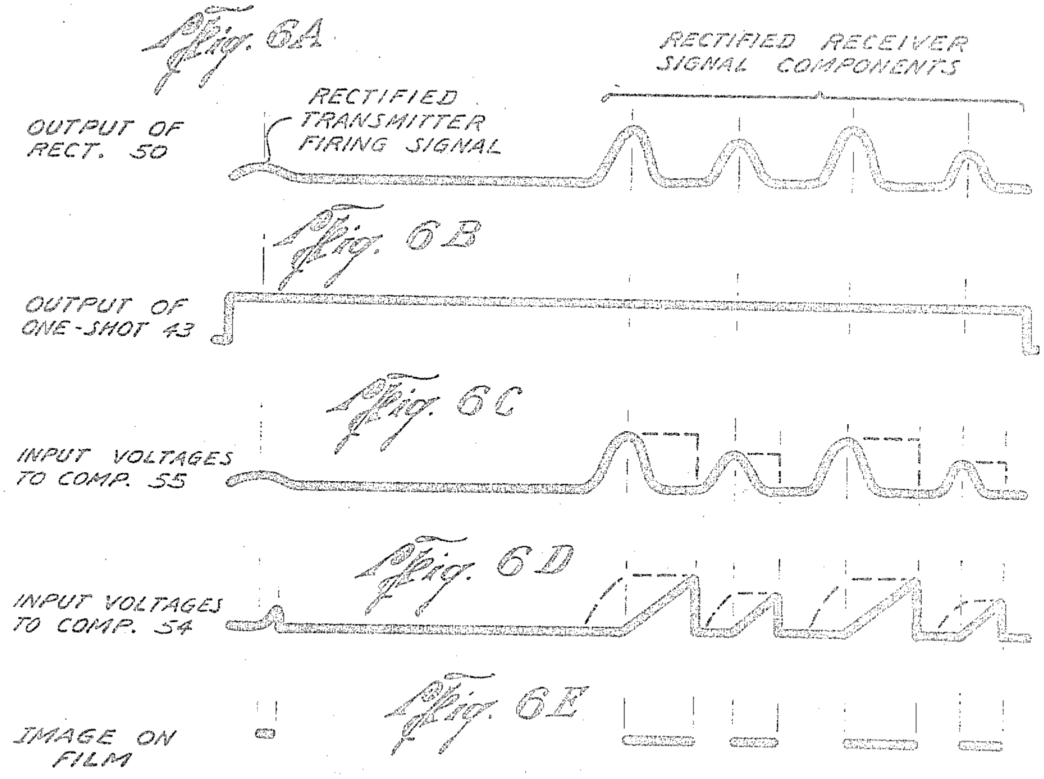

Now referring to FIGURES 5 and 6A–6E in conjunction to explain the operation of the FIGURE 5 apparatus, FIGURE 6A shows a typical example of an output signal from rectifier 50. Looking at FIGURE 6C, the solid line wave shape of FIGURE 6C represents the reproduced output signal from rectifier 50 which is applied to voltage comparator 55 as the reference voltage thereof. The dotted line wave shape of FIGURE 6C represents the voltage developed across capacitor 53. Due to the low charing resistance through diode 52, this voltage across capacitor 53 will follow the rectified output voltage from rectifier 50 until said rectified voltage reaches its peak value. However, once this rectified signal voltage reaches its peak value, the voltage across capacitor 53 will remain at this peak value due to the high discharge resistance presented to capacitor 53.

Then, as the rectified well logging signal voltage begins decreasing, just after reaching its peak value, the peak voltage on capacitor 53 will exceed the instantaneous voltage of the rectified well logging signal of FIGURE 6A, thus energizing comparator 55. Assuming that inhibit gate 58 is deenergized, this constant amplitude output voltage from voltage comparator 55 will energize the glow modulator tube 21 so as to provide a constant intensity light output and thus a constant density image on recording medium 28.

Referring now to FIGURE 6D, this output voltage from voltage comparator 55 will cause the constant current amplifier 56 to begin charging capacitor 57 at a constant rate. The solid line plot of FIGURE 6D represents capacitor 57 charging up. The dotted line plot of FIGURE 6D represents the voltage output from peak detector 51. When the voltage across capacitor 57 is substantially equal to or slightly greater than the peak voltage detected by peak detector 51, voltage comparator 54 will generator 54 will generate an output signal which energizes inhibit gate 58. This turns off the glow modulator tube 21 and causes capacitors 53 and 57 to discharge through gates 60 and 59 respectively. This point in time is represented by the sharpe drop to zero volts in FIGURES 6C and 6D.

The resulting images of traces recorded on recording medium 28 are shown in FIGURE 6E. It can be seen that these traces are initiated when the wave shapes of FIGURE 6A are at their peak values and terminate when the voltage on capacitor 57 substantially equals this peak voltage. Since the voltage developed across capacitor 57 is increasing as a function of time and the glow modulator tube 21 is turned off when the peak voltage across capacitor 57 equals the detected peak voltage, the circuitry of FIGURE 5 acts to convert peak amplitude to a time period. That is to say, the time that it takes capacior 57 to charge up to the detected peak voltage is proportional to the peak amplitude since capacitor 57 is charging at a constant rate. Thus, the width of each trace of FIGURE 6E is proportional to the peak amplitude of the corresponding wave shape.

It should be pointed out that the charging rate of capacitor 57 (slope of solid line curve in FIGURE 6D) should be selected with a view of the maximum expected peak amplitude so that a trace corresponding to one signal portion (one pulse) should not overlap with the next trace. In this regard (referring to FIGURE 5), the glow modulator tube 21 may be energized for even longer time periods (and thus the charge up of capacitor 57 can be slower) bysetting a flip-flop 67 with the output signal from voltage comparator 55. The "1" output of flip-flop 67 is then used to turn on glow modulator tube 21, start capacitor 57 charging up, and reset capacitor 53, which stores the peak value, by energizing gate 60 via a differentiator 68 and forward-biased diode 69. The differentiator 68 and diode 60 cause the reset to be momentary and only takes place when flip-flop 67 is set. By this means, the capacitor 57 of peak detector 51 can begin recharging even while glow modulator tube 21 is still energized. Now, when voltage comparator 54 is energized, the flip-flop 67 is reset to begin the operation again. This alternative embodiment is represented in FIGURE 5 by the dotted line connections along with the dotted line X's representing which conductors are detected.

To insure that the traces are separated by equal distances, i.e., equal depth displacement on the recording medium, the signal from one-shot 43 of FIGURE 1 is utilized to control when a recording is to be made, as in FIGURE 1. That is to say, when the one-shot 43 is turned off, inverter 61 wil provide a "1" output to gates 58, 59 and 60 which will maintain the voltages across capacitors 53 and 57 at zero volts and inhibit the output from voltage comparator 55 from reaching the glow modulator tube 21. Now when the one-shot 43 turns on, thus indicating that a trace is to be recorded, the output from inverter 61 goes to "0" and enables the above-described operation to proceed.

Referring to FIGURE 7 (the left-hand portion), there is shown a typical example of how the recording medium 28 will look after developing when utilizing the recording technique of FIGURE 5. The initiation of each trace will present the time relationship of the various signals to each other on the recording medium and the width of each trace will represent the amplitude of each of the signals. Since the light intensity of glow modulator tube 21, when turned on, is constant and the traces are evenly spaced on the recording medium 28 as a function of depth, the resulting recorded log will have a constant density.

It can thus be seen that with the recording technique of FIGURE 5, recordings of periodically received well logging signals can be accurately made without such factors as light intensity and the developing temperature and time affecting the recorded log.

There is also shown in FIGURE 5, apparatus for providing an analog curve type recording of other well logging measurements at the same time that the above-discussed log is being made. To accomplish this, a slotted disc 71 is connected to the shaft 31 so as to rotate with the rotating mirror 25. A light source 72 is fixed to the motor housing (i.e., fixed in space) on one side of the slotted disc 71 and passes light through the slots in the disc 68, when they are in the right position, to photocells 73 positioned on the other side of the disc 71 and fixed to the housing 30 by arms 74. After suitable wave-shaping, the signals picked up by the photocells set a flip-flop 75 which causes a ramp to be generated by a ramp generator 76.

The analog well logging signal, which is shown in FIGURE 5 being derived from the velocity and travel time circuits 19 of FIGURE 1, is supplied to the "reference" input of a voltage comparator 77 to which also is supplied the ramp voltage from ramp generator 76. When the ramp voltage equals (or is slightly greater) than the well logging signal voltage, comparator 77 causes a one-shot 78 to momentarily flash the glow modulator tube 21. The switch 79 shown on the output of one-shot 78 is, of course, closed if it is desired to record these analog quantities. Flip-flop 75 is then reset by a pulse from photocells and shaping circuits 73, which causes the "0" output of flip-flop 75 to energize a gate circuit 80. Gate circuit 80 then resets comparator 77. (This could be like gate 59 resetting capacitor 57 in FIGURE 5). This recording technique is shown in greater detail in copending applications Ser. No. 693,894 by G. Samodai and J. Smith, filed on Dec. 27, 1967, and Ser. No. 694,010 by D. R. Tanguy, filed on Dec. 27, 1967.

To explain this operation, refer to FIGURES 5 and 8A–8C in conjunction. FIGURES 8A and 8B show the set and reset pulses from photocells and shaping circuits 73. (It can be seen that slotted disc 71 requires two tracks and thus two photocells are required to generate both the set and reset pulses.) FIGURE 8C shows the input voltages to comparator 77, the solid line representing the ramp voltage and the dotted line representing the analog well logging signal. The slotted disc 71 is constructed so that the set pulse corresponds in time to the zero magnitude level on the recording track set aside for these analog well logging signals and the reset pulse corresponds to the maximum magnitude level. It can be seen that the instantaneous voltage of the ramp function of FIGURE 8C will be proportional to the relative position of the light beam on the width of the recording medium. Thus, upon the voltage of the ramp function equalizing the voltage of the well logging signal, the glow modulator tube 21 will be momentarily turned on to produce an image at the position on the recording medium corresponding to the voltage of the well logging signal.

Thus, in operation, the rotating mirror will sweep the modulated light across a first track of the recording medium to produce a log as shown in FIGURE 4 or 7. As the rotating mirror 25 continues to rotate, the glow modulator tube 21 will be momentarily flashed at the proper time to produce an image at the proper position on the second track. The second track will then contain an analog type curve, as shown in the right-hand side of FIGURE 7.

Instead of initiating the recording trace at the peak of the well logging signals, it may be desirable to initiate the recording trace when the well logging signal wave shape crosses zero volts. Tihs would be advantageous in the event that some of the selected portions (i.e., positive half cycles) of the well logging signals may be unsymmetrical. Looking at FIGURE 9, there is shown apparatus for initiating the recording trace when the amplitude of the well logging signals passes from + to — through zero volts. To provide a measure of the peak voltage, the well logging signals from signal processing circuits 18 of FIGURE 1 are applied via a double-throw switch 84 to a peak detector 85 similar to peak detector 51 of FIGURE 5. The output of peak detector 85 is supplied to the high impedance input of an amplifier 86. By this means, the capacitor 85*a* of peak detector 85 will charge up to the peak positive voltage of the applied well logging signals and hold its charge until discharged by other circuit devices.

To initiate the recording trace, the well logging signals are also applied to the input of a zero crossing detector 88 via an amplifier 87. The zero crossing detector 88 is constructed in a manner to produce an output signal when the applied input signal crosses zero volts from the positive to negative polarity. This output signal from zero crossing detector 88 sets a flip-flop 89 whose constant amplitude "1" output energizes the glow modulator tube 21 of FIGURE 1. To provide amplitude to time conversion, the "1" output from flip-flop 89 also energizes a gate 90 which allows the capacitor 85*a* of peak detector 85 to discharge through a resistor 91 to a negative DC voltage supply 92. When the voltage across capacitor 85*a* of peak detector 85 crosses zero volts, the output signal from a zero crossing detector 93 resets flip-flop 89 to turn the glow modulator tube 21 off and de-energize the gate 90. This, then, will leave the voltage across capacitor 85*a* at zero volts for the next applied signal. Since the capacitor 85*a* was discharging at a constant rate, the time which glow modulator tube 21 was energized is proportional to the peak voltage detected by peak detector 85.

Figures 10A, 10B, 10C, 10D, 10E:
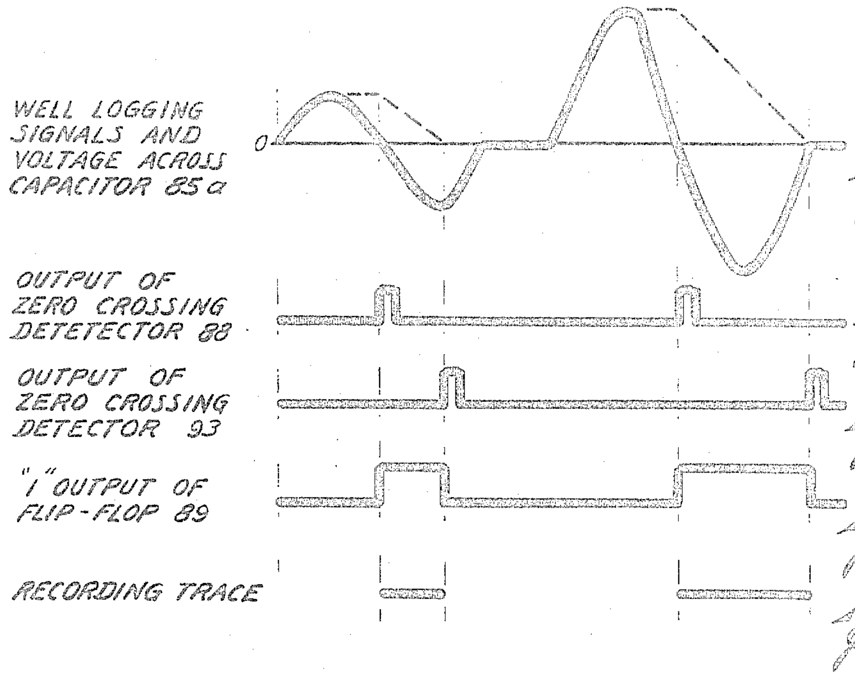

Turning now to FGURES 10A–10E, in conjunction with FIGURE 9, to gain a better understanding of the operation of the FIGURE 9 apparatus, FIGURE 10A shows the applied well logging signals from signal processing circuits 18 of FIGURE 1 (the solid line wave shape). The dashed line wave shape represents the voltage across capacitor 85*a*. Thus, it can be seen that the voltage across capacitor 85*a* will charge up to the peak voltage of the applied well logging signals and hold its charge until discharged through resistor 91 when gate 90 is energized. Zero crossing detector 88 supplies the pulse output of FIGURE 10B upon the well logging signal crossing zero volts. As seen by comparing FIGURES 10B and 10D, this pulse output from zero crossing detector 88 sets the flip-flop 89 which causes the voltage across capacitor 85*a* to start discharging at a constant rate. Comparing the dashed line wave shape of FIGURE 10A with the pulses of FIGURE 10C, it can be seen that when the voltage across capacitor 85*a* (dashed line voltage is equal to zero volts) zero crossing detector 93 generates the pulses of FIGURE 10C to reset flip-flop 89. The resulting recording trace has the same time duration as the energizaion of flip-flop 89 as can be seen in FIGURE 10E as stated earlier, since the detected peak voltage is discharged or decreased at a constant rate, the time duration, and thus width on the recording medium, of the recording trace of FIGURE 10E will be proportional to the detected peak voltage.

It should also be mentioned in connection with FIGURE 9 that, if desired, the integral of the well logging signals could be detected and utilized in place of the detected peak amplitude. In this event, the width of the recording trace would be proportional to the total energy of the various selected portions (i.e., positive half cycles) of the well logging signals. This alternative embodiment is represented in FIGURE 9 by switching the double-throw switch 84 to the other position so as to channel the well logging signals via a diode 94 to the input of the amplifier 86. A switch 95, is closed in ths embodiment, so as to connect a capacitor 96 across the amplifier 86 so that the amplifier 86 and capacitor 96 combination will comprise an integrator. The voltage across capacitor 96 is discharged through resistor 91 in the same manner as well as the voltage across capacitor 85*a* in the earlier embodiment.

Now referring to FIGURE 11, there is shown another embodiment of the present invention. In this FIGURE 11 embodiment, the well logging signals from signal processing circuits 18 are applied via a double-throw stepping switch 97 to a selected one of a pair of peak detectors 98 or 99. The output from a selected one of the peak detectors 98 or 99 is supplied to an amplifier 100 via another double-throw stepping switch 101. The output from amplifier 100 is supplied to the input of a positive to negative type zero crossing detector 102 which produces an output pulse upon the input signal from amplifier 100 crossing zero volts from a positive to negative polarity. This output pulse from zero crossing detector 102 is utilized to reset a flip-flop 103 and energize a solenoid 101*a* to step the double-throw stepping switch 101 to its other position.

The signals from signal processing circuits 18 are also applied to a negative to positive zero crossing detector 104 via an amplifier 105. When the applied signals from circuits 18 across zero from the negative polarity to the positive polarity, zero crossing detector 104 generates a pulse which is delayed by a delay circuit 106. The delayed output signal is utilized to set the flip-flop 103 as well as to energize a gate circuit 107 and energize a solenoid 97*a* to step the switching contact of the stepping switch 97 to the other position. When the gate 107 is energized, the capacitor of a selected one of the peak detectors 98 and 99, depending on which position the switch 101 is in, is discharged through a resistor 108 to a negative DC voltage source 109.

Concerning the operation of the FIGURE 11 apparatus, refer to FIGURE 11 and FIGURES 12A–12F in conjunction. Initially, the switching contacts of switches 97 and 101 are set so as to connect the input and output of only one of the peak detectors to the remainder of the circuitry of FIGURE 11. Assume, for present purposes, this initial detector is detector 98. The well logging signals of FIGURE 12A (the solid line wave shape) are then applied to the peak detector 98 to charge up the capacitor therein in the same manner as in FIGURE 9. The zero crossing of the well logging signal of FIGURE 12A from a negative to a positive polarity will produce the pulses shown in FIGURE 12B. The resulting delayed pulses, shown in FIGURE 12C, by energizing gate 107, cause the peak voltage detected by peak detector 98 to being discharging or decreasing through resistor 108. This delay time is selected to be greater than the greatest anticipated time interval between the leading edge of a selected well logging signal portion (i.e., for positive half cycles, the — to + zero crossing) and the peak of the same signal portion. This delayed pulse also causes the switch 97 to switch the well logging signals to the other peak detector 99 which is then ready to detect the peak voltage of the next selected portion of the well logging signals applied from signal processing circuits 18.

Figures 12A, 12B, 12C, 12D, 12E, 12F:
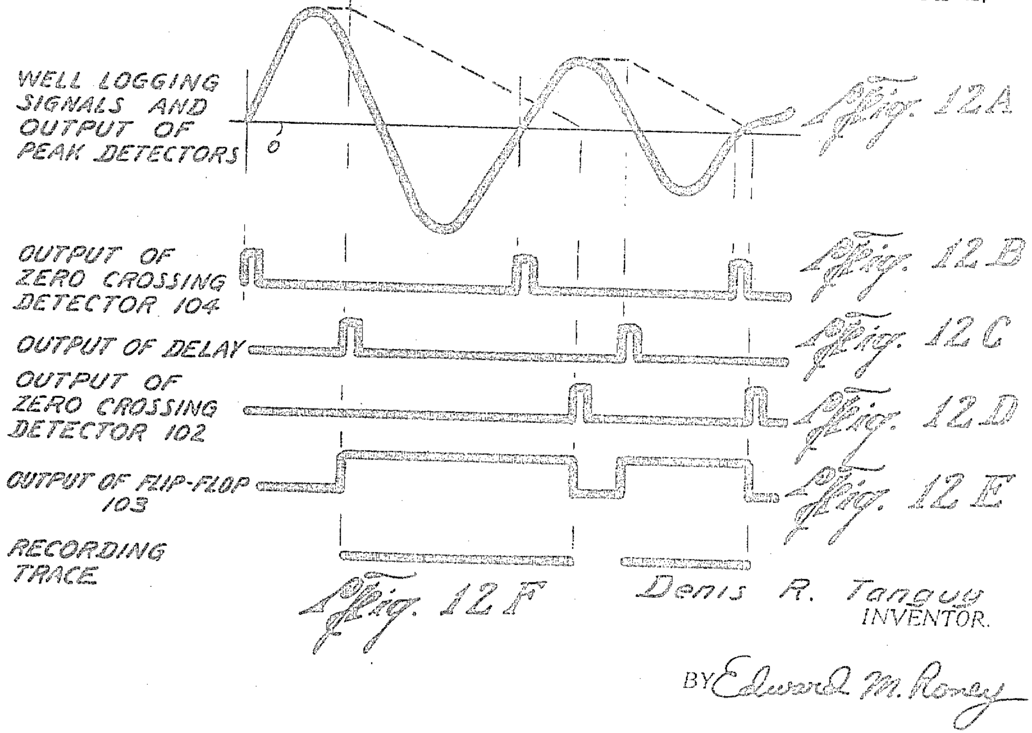

Now, when the voltage output of peak detector 98 reaches zero volts, zero crossing detector 102 is energized, as seen by comparing FIGURES 12D and 12A. This pulse of FIGURE 12D will reset the flip-flop, as seen by comparing FIGURES 12D and 12E, and switch the stepping switch 101 to the output of the other peak detector 99 so that the peak voltage detected thereby may be discharged through resistor 108 when gate 107 is energized by the next delayed output pulse of FIGURE 12C. Since the flip-flop 103, which controls the glow modulator tube 21, is set by the delayed pulses of FIGURE 12C and reset by the output pulses from zero crossing detector 102 of FIGURE 12D as best seen in FIGURE 12E, the resulting recording traces of FIGURE 12F will have a time duration or recording medium width proportional to the detected peak voltage of each of the selected well logging signal portion (positive half cycles).

By utilizing the apparatus of FIGURE 11, the initiation of each recording trace can be referenced to the initial portion of each selected well logging signal portion (i.e., since the time delay of delay circuit 106 is fixed, the initiation of the recording trace is referenced to the initial well logging signal portion). Additionally, since the peak of one pulse or signal portion can be detected in one peak detector at the same time that the amplitude to time conversion of a preceding pulse or signal portion is taking place, a greater resolution can be obtained. That is to say, the width of the recording trace of FIGURE 12F can be greater for any given amplitude because of this simultaneous processing arrangement of FIGURE 11. This situation is illustrated in FIGURE 12A where peak detection of a second pulse is occurring simultaneously with the amplitude to time conversion of the first pulse.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording well logging signals of the type wherein energy is periodically transmitted into earth formations adjoining a borehole and energy caused by said transmitted energy is received and converted into well logging signals suitable for transmission to the surface of the earth, comprising:
(a) moving a recording medium as a function of borehole depth;
(b) producing an image on the recording medium;
(c) converting the amplitude levels of the well logging signals to substantially constant amplitude signals having time periods representative of said amplitude levels and modulating the image in response to said signals; and
(d) sweeping the modulated image across the width of the recording medium at a frequency representative of the frequency at which energy is transmitted into the adjoining formations.

2. The method of claim 1, wherein the well logging signal is a multicycle signal and the step of converting the amplitude levels to signals having time periods representative thereof and modulating the image includes:
(1) generating a substantially constant amplitude signal in response to the amplitude of each cycle of the well logging signal attaining its peak value;
(2) turning off the substantially constant amplitude signal after a time period representative of said peak value so that said substantially constant amplitude signal will take on the form of a recurring substantially constant amplitude signal; and
(3) modulating the image in response to the recurring substantially constant amplitude signal whereby the traces recorded on the recording medium will have substantially the same density regardless of amplitude.

3. A method of investigating earth formations surrounding a borehole, comprising:
(a) transmitting energy into the formations and receiving representations of the transmitted energy to produce well logging signals;
(b) generating a light output;
(c) moving a recording medium as a function of borehole depth;
(d) modulating the light output with representations of the well logging signals;
(e) repetitively sweeping the modulated light across the width of the recording medium at a substantially constant frequency; and
(f) generating firing signals which are mechanically synchronized with the frequency of the repetitive sweeping light for initiating the transmission of energy into the formations.

4. Apparatus for recording well logging signals of the type wherein energy is repetitively transmitted and received in a well bore and converted into well logging signals suitable for transmission to the surface of the earth, comprising:
(a) image producing means adapted to be modulated;
(b) a recording medium adapted to be moved as a function of borehole depth;
(c) means for converting the amplitude levels of the well logging signals to substantially constant amplitude signals having time periods representative of said amplitude levels and modulating the image producing means with said signals; and
(d) means adapted for repetitively sweeping the image from the image producing means across the width of the recording medium at a frequency functionally related to the frequency at which energy is repetitively transmitted.

5. The apparatus of claim 4 wherein each well logging signal to be recorded is a multicycle signal of varying amplitude and the means for converting the amplitudes to time periods representative thereof includes means responsive to selected portions of the well logging signals for converting the amplitude levels of the multicycle signal to said signals having time periods representative of said amplitude levels.

6. The apparatus of claim 5 wherein the means for converting the amplitude levels to time periods representative thereof includes:
(1) means for generating a substantially constant amplitude signal in response to the amplitude of each cycle of the well logging signal attaining the peak value thereof;
(2) means responsive to said peak ampliude for turning off the substantially constant amplitude signal after a time period representative of said peak amplitude so that said substantially constant amplitude signal takes on the form of a recurring substantially constant amplitude signal; and
(3) means for modulating the image producing means with recurring substantially constant amplitude signal whereby the traces recorded on the recording medium will have substantially the same density regardless of the peak amplitude level.

7. The apparatus of claim 4 wherein the image producing means is a glow modulator tube adapted to make an image on the recording medium and the means adapted for sweeping the image across the recording medium includes:
(1) a rotatable mirror disposed optically between the glow modulator tube and the recording medium so as to reflect the modulated light from the glow modulator tube onto the recording medium; and
(2) means for rotating the rotatable mirror at a frequency functionally related to the frequency at which energy is transmitted into the earth formations.

8. The apparatus of claim 5 wherein the means for converting the amplitude levels to time periods representative thereof includes:
(1) means for detecting when the amplitude level of each selected portion of the well logging signals is substantially equal to zero volts and generating a first output signal representative thereof;
(2) means responsive to the well logging signals for producing a peak voltage representative of the peak amplitude of each selected portion of the well logging signals;
(3) means responsive to said first output signal for decreasing said peak voltage at a constant rate;

(4) means responsive to the decreasing peak voltage for generating a second output signal when the decreasing peak voltage reaches a given voltage level; and (5) means responsive to the first and second output signals for producing a constant amplitude pulse to modulate the image producing means.

9. The apparatus of claim 5 wherein the means for converting the amplitude levels to time periods representative thereof includes:

(1) means for integrating each selected portion of the multicycle well logging signals and producing a voltage representative of each integrated signal portion;

(2) means responsive to the well logging signals for detecting when each of said selected portions has terminated and generating a first output signal representative thereof;

(3) means responsive to said first output signal for decreasing, at a constant rate, said voltage representative of the integrated signal portion;

(4) means responsive to the decreasing voltage for generating a second output signal when said decreasing voltage has reached a given voltage level; and (5) means responsive to the first and second output signals for producing a constant amplitude pulse to modulate the image producing means.

10. The apparatus of claim 5 wherein the means for converting the amplitude levels to time periods representative thereof includes:

(1) means responsive to the leading edge of each selected portion of the well logging signals for generating a first output signal;

(2) means for delaying the first output signal to produce a delayed output signal;

(3) means for detecting the peak voltage of each of said selected well logging signal portions;

(4) voltage decreasing means responsive to the delayed output signal for decreasing the detected peak voltage at a constant rate;

(5) means responsive to the decreasing peak voltage for generating a second output signal when the decreasing peak voltage reaches a given voltage level; and (6) means responsive to the delayed output signal and the second output signal for producing a constant amplitude pulse to modulate the image producing means.

11. The apparatus of claim 10 wherein the means for detecting the peak voltage comprises two separate detecting means and further including first switching means responsive to the delayed output signal for alternatively supplying the well logging signals to each one of the detecting means in sequence and further including second switching means responsive to the second output signals for sequentially connecting the voltage decreasing means to each one of the detecting means in sequence, whereby one detecting means may detect the peak voltage of one well logging signal portion while, at the same time, the peak voltage of another well logging signal portion detected by the other detecting means may be decreased.

12. Apparatus for investigating earth formations surrounding a borehole, comprising:

(a) means in the borehole for transmitting energy into the formations and receiving representations of the transmitted energy to produce well logging signals;

(b) an image producing means adapted to be modulated;

(c) a recording medium adapted to be moved as a function of borehole depth;

(d) means for modulating the image producing means with representations of the well logging signals;

(e) mechanical sweeping means adapted for repetitively sweeping the modulated image across the width of the recording medium at a substantially constant frequency; and (f) means coupled to the mechanical sweeping means for generating firing signals for initiating the transmission of energy into the formations in synchronism with the sweeping of the modulated image across the recording medium.

13. Apparatus for recording well logging signals representative of the type wherein energy is repetitively transmitted and received from a logging tool moved through varying depths in a well borehole comprising:

means including master timing means for supplying electrical signals representative of received and transmitted energy to a recording system at periodic time intervals, said recording system including:

a glow modulator tube;

a recording medium adapted for movement as a function of the borehole depth of the logging tool;

means for modulating the light output of said glow modulator tube with said representative electrical signals;

rotatable light reflecting means optically disposed between said glow modulator tube and said recording medium to reflect the modulated light output of said glow modulator tube onto said recording medium; and prime mover means, coupled to said rotatable reflecting means and powered by energy derived from said master timing means for rotating said reflecting means at a frequency functionally related to the frequency at which said energy is repetitively transmitted.

References Cited

UNITED STATES PATENTS

| | | | |
|---|---|---|---|
| Re. 25,928 | 12/1965 | Geyer et al. | 340—18 |
| 3,278,746 | 10/1966 | Fiat | 250—83.3 |
| 1,792,264 | 2/1931 | Alexanderson | 346—108 X |
| 2,654,064 | 9/1953 | Broding | 346—108 X |
| 3,006,713 | 10/1961 | Klein et al. | 346—108 |
| 3,302,165 | 1/1967 | Anderson et al. | 340—18 |

JOSEPH W. HARTARY, Primary Examiner

U.S. Cl. X.R.

340—15.5; 346—33, 108

20.1653

UNITED STATES PATENT OFFICE
CERTIFICATE OF CORRECTION

Patent No. 3,488,658 Dated January 6, 1970

Inventor(s) Denis R. Tanguy

It is certified that error appears in the above-identified patent and that said Letters Patent are hereby corrected as shown below:

Column 5, line 7 (application Page 10, line 16)

delete "ging measurements. However, since the rate at which"

Column 5, line 14 (application Page 10, line 21)

"measurement" should read -- measurements --.

Column 7, line 65 (application Page 17, line 3)

S should read -- "S" --.

Column 8, line 14 (application Page 17, line 24)

"proceesing" should read -- processing --.

Column 9, lines 11 and 12 (application Page 20, line 3)

"will generator 54" should read -- generate --.

Column 9, line 62 (application Page 21, line 18)

"wil" should read -- will --.

Column 12, line 1 (application Page 26, line 20)

"ths" should read -- this --.

Column 12, line 26 (application Page 27, line 13)

"across" should read -- cross --.

SIGNED AND SEALED OCT 13 1970

(SEAL)
Attest:

Edward M. Fletcher, Jr.
Attesting Officer

WILLIAM E. SCHUYLER, J
Commissioner of Patent

FORM PO-1050 (10-69)

USCOMM-DC 60376-P69
★ U.S. GOVERNMENT PRINTING OFFICE : 1969 O—366-334